(12) United States Patent
Kosa

(10) Patent No.: US 11,445,054 B2
(45) Date of Patent: *Sep. 13, 2022

(54) SMARTPHONE CASE HAVING RECONFIGURABLE INPUT CONTROL FEATURES FOR CONTROLLING SMARTPHONE APPS

(71) Applicant: Devan Kosa, Soap Lake, WA (US)

(72) Inventor: Devan Kosa, Soap Lake, WA (US)

(*) Notice: Subject to any disclaimer, the term of this patent is extended or adjusted under 35 U.S.C. 154(b) by 59 days.

This patent is subject to a terminal disclaimer.

(21) Appl. No.: 17/101,214

(22) Filed: Nov. 23, 2020

(65) Prior Publication Data

US 2021/0075894 A1    Mar. 11, 2021

Related U.S. Application Data

(63) Continuation of application No. 16/721,566, filed on Dec. 19, 2019, now Pat. No. 10,848,604, which is a continuation of application No. 16/237,675, filed on Dec. 31, 2018, now Pat. No. 10,560,558.

(51) Int. Cl.
| | |
|---|---|
| *H04M 1/02* | (2006.01) |
| *H04B 1/38* | (2015.01) |
| *H04B 5/00* | (2006.01) |
| *H04W 4/00* | (2018.01) |
| *G06F 1/16* | (2006.01) |
| *A63F 13/22* | (2014.01) |
| *A63F 13/24* | (2014.01) |

(52) U.S. Cl.
CPC ............ *H04M 1/026* (2013.01); *A63F 13/22* (2014.09); *A63F 13/24* (2014.09); *G06F 1/1656* (2013.01); *G06F 1/1684* (2013.01); *A63F 2300/1018* (2013.01)

(58) Field of Classification Search
None
See application file for complete search history.

(56) References Cited

U.S. PATENT DOCUMENTS

| | | | | |
|---|---|---|---|---|
| 7,068,499 | B2* | 6/2006 | Aisenberg | G06F 1/1616 345/158 |
| 7,618,260 | B2* | 11/2009 | Daniel | A44C 5/0007 439/528 |
| 7,951,007 | B2* | 5/2011 | Wolinsky | A63F 13/92 463/40 |

(Continued)

FOREIGN PATENT DOCUMENTS

| | | | | |
|---|---|---|---|---|
| CN | 108348055 | * | 7/2018 | H04M 1/21 |

*Primary Examiner* — Tuan A Tran (57) ABSTRACT

A smartphone case for holding and protecting a smartphone, while also having various features for controlling an app, such as a video game running on the smartphone. The smartphone case includes a case body having a case back, and a case side wall that extends circumferentially around the case back, including four corners. The case side wall also extends above and below a smartphone held by the case, thereby forming a front rim and a back rim. The case side wall also includes corner connectors configured to connect with a swappable input control module. The case back also includes dedicated controls, and at least one recess for storing a swappable control module while not in use. A long side of the case side wall includes a left bumper and a right bumper. An app provides a GUI for assigning the dedicated and swappable controls for an app to be controlled.

17 Claims, 9 Drawing Sheets

(56) References Cited

U.S. PATENT DOCUMENTS

| | | | |
|---|---|---|---|
| 8,149,224 B1* | 4/2012 | Kuo | G06F 1/1692 345/157 |
| 8,249,656 B2* | 8/2012 | Sherman | H04M 1/0254 710/25 |
| 8,391,921 B2* | 3/2013 | Moran | H04M 1/0256 455/90.3 |
| 8,493,282 B2* | 7/2013 | Moran | G06F 1/1626 345/173 |
| 8,817,476 B2* | 8/2014 | Naukkarinen | G06F 1/1632 361/729 |
| 8,842,429 B2* | 9/2014 | Ahn | G06F 1/1616 361/679.41 |
| 8,971,049 B1* | 3/2015 | Vier | G06F 1/1675 361/740 |
| 9,086,847 B2* | 7/2015 | Filipovic | A61B 5/1112 |
| 9,160,824 B2* | 10/2015 | Torset | H04M 1/0258 |
| 9,621,229 B2* | 4/2017 | Fishman | G06F 1/3234 |
| 9,671,835 B2* | 6/2017 | Filipovic | G06F 1/183 |
| 9,717,045 B2* | 7/2017 | Eremenko | H02J 50/80 |
| 9,778,778 B2* | 10/2017 | Helmes | G06F 1/1632 |
| 9,781,851 B2* | 10/2017 | Chuang | H05K 5/0204 |
| 9,867,125 B2* | 1/2018 | Eremenko | H02J 7/025 |
| 9,887,725 B1* | 2/2018 | Wilder | H04M 1/6041 |
| 9,929,778 B2* | 3/2018 | Fishman | H04M 1/0254 |
| 10,084,896 B1* | 9/2018 | Cho | H04B 1/3833 |
| 10,209,817 B1* | 2/2019 | Cazzoli | G06F 3/02 |
| 10,484,521 B2* | 11/2019 | Berg | H04M 1/7246 |
| 10,673,996 B2* | 6/2020 | Cho | H05K 5/0017 |
| 2009/0147758 A1* | 6/2009 | Kumar | H04L 67/04 370/350 |
| 2011/0199325 A1 | 8/2011 | Payne | |
| 2012/0108342 A1 | 5/2012 | Rudell et al. | |
| 2013/0154943 A1 | 6/2013 | Joynes et al. | |
| 2013/0267322 A1 | 10/2013 | South | |
| 2014/0121023 A1 | 5/2014 | Tahara et al. | |
| 2014/0206451 A1 | 7/2014 | Helmes et al. | |
| 2015/0018101 A1 | 1/2015 | Schoenith et al. | |
| 2015/0031452 A1 | 1/2015 | Rundell et al. | |
| 2015/0084900 A1 | 3/2015 | Hodges et al. | |
| 2015/0341712 A1* | 11/2015 | Wilcox | H04M 1/72409 381/332 |
| 2016/0147359 A1 | 5/2016 | Helmes et al. | |
| 2016/0149426 A1 | 5/2016 | Hodges et al. | |
| 2016/0231773 A1 | 8/2016 | Inoue et al. | |
| 2016/0345628 A1* | 12/2016 | Sabet | A24F 40/95 |
| 2018/0345130 A1 | 12/2018 | Wells et al. | |
| 2018/0369692 A1 | 12/2018 | Winick | |

* cited by examiner

SMARTPHONE CASE HAVING RECONFIGURABLE INPUT CONTROL FEATURES FOR CONTROLLING SMARTPHONE APPS

CROSS REFERENCE TO RELATED APPLICATIONS

This application is a continuation of U.S. patent application Ser. No. 16/721,566, filed on Dec. 19, 2019 and currently pending, which is a continuation of U.S. patent application Ser. No. 16/237,675, filed on Dec. 31, 2018 and issued as U.S. Pat. No. 10,560,558 on Feb. 11, 2020.

FIELD OF THE INVENTION

This invention relates generally to smartphone cases, and more particularly to smartphone cases having multiple app control functions in addition to protecting a smartphone.

BACKGROUND OF THE INVENTION

A game controller is a device typically used with game systems to provide input control signals to a video game running as software on the game system. The input control signals are typically used to control an object, a character, or cursor in the video game. A game controller is usually connected to a game system or computer via a wire or cord. Since the mid-2000s, wireless controllers have become common. Controllers have since evolved to include directional pads, multiple buttons, analog sticks, joysticks, motion detection, touch screens and many other features. These control functions can also be used to control the functions of programs other than games, such as music recording/processing programs and word processing programs.

With the advent of smartphones and the program apps (i.e. application programs) that were written to run on those smartphones, manufacturers have created game controller input functions that are adapted for use with a smartphone. One such controller interface is the Bluetooth Wireless Gaming Controller Gamepad for Android Smartphone, manufactured and sold by MYGT™. This game controller has a built-in flip-up phone holder and can pair with a smartphone using Bluetooth. However, this game controller is a bulky device that is entirely separate from the smartphone, rendering it inconvenient, and lacking sufficient portability.

FlipSide™ is a protective smartphone case that doubles as a gaming controller for controlling apps running on the smartphone. This dual purpose smartphone case comes with AB buttons just like those used for arcade games and video game consoles. The FlipSide™ case has sides that swing out and move downwardly away from the smartphone to provide two upper corners in the case when the smartphone is in landscape mode. The two upper corners can accept removable corner input control modules. Each removable corner control module has a large button, and three smaller buttons. When the removable corner modules are inserted, they do not block the screen as they would before the sides of the case have been moved out and downward. It is not clear where to store the removable corner control modules, so it is possible that they can be lost. The back of the case is not used for any purpose other than to protect the back surface of the phone. Further, the input control functions provided by the modules appear to be fixed, and thus are not reconfigurable to suit the input requirements of different apps.

FLITCHIO™ is another protective smartphone case that doubles as a gaming controller for the smartphone. FLITCHIO™ includes two joysticks on the back of the case, as well as two buttons on the top back edge of the case. All of these controls are user-programmable, in that the user can determine their functions. The controls are pressure sensitive so that the harder one presses, the more rapid the response of the initiated control function (e.g. the faster one will punch, fire, or run). The controls also provide tactile feedback. The case communicates with the phone using Near-field Communication (NFC) technology. However, there are no controls provided on the front of the case, which could be considered undesirable for some gamers who are accustomed to controls that are located on the front of a typical game controller.

SUMMARY OF THE INVENTION

A smartphone case is provided for holding and protecting a smartphone, while also having various features for controlling input control functions of an app (application program) such as a video game, a music recording/processing program, or a word processing program, running on the smartphone. The smartphone case provides an extremely compact and portable app controller built into the case.

The smartphone case has two swappable control modules that attach to the top left and right corners over the front of the phone, and can be more securely stored on the back of the phone when not in use. The swappable control modules can be, for example, two joysticks, or can be replaced by other types of controller to suit the app and/or the user. The back of the phone also has an A-button, a B-button, and a D-Pad, as are commonly found on game controllers. The smartphone case also includes a left bumper and a right bumper along the top long side of the case side wall. Thus, the smartphone case can be configured with all of the control interface functions found on a typical game controller. Because they are built into, or are swappably interfaced with, the case itself, they are always available for use as control interfaces by which to interact with and to control apps such as games running on the smartphone. In addition, they reproduce a more preferable controller experience than do touchscreen game controls, an interface many users (such as gamers) find inadequate. Further, the configuration of input controllers on the front of the case is customizable through the swappable control modules. Alternate controllers for the front of the case can be stored in two recesses in the back of the case so that they are quickly available for convenient reconfiguration of the front side controls.

A general aspect of the invention is a smartphone case for holding and protecting a smartphone, the smartphone case also having features for controlling a video game. The smartphone case includes: a case body, the case body having a case back; a case side wall that extends circumferentially around the case back so as to form two long sides, two short sides, and four corners, the case side wall also configured to extend above and below a smartphone when the smartphone is held by the case, thereby forming a front rim that extends above the smartphone and circumferentially around the case, and forming a back rim that extends below the case back and circumferentially around the case back. The smartphone case also includes a pair of corner connectors, a first corner connector included at a first corner at a first end of a long side of the front rim, and a second corner connector included at a second corner at a second end of the long side of the front rim, each corner connector configured to connect with a swappable control module. And, the smartphone case includes a pair of swappable control modules, each swappable control module configured to connect with a corner connector of the pair of corner connectors, the swappable control modules configured to provide input control information to one or more applications running on the smartphone when the smartphone is held by the case.

In some embodiments, each corner connector includes: at least one snap-in receptacle, a plurality of corner conductors, and at least one magnetic surface.

In some embodiments, at least one of the swappable control modules is assigned to control one or more inputs of an app by an application program running on the smartphone when held by the case, the application program configured to: scan the app to identify inputs of the app for assignment and display them using a GUI, and receive information from a user through the GUI for assigning the one or more of the identified inputs of the app to at least one of the swappable control modules.

In some embodiments, the smartphone case further includes: one or more dedicated input control devices each configured to be assigned by a user through the GUI of the application program, wherein the application is further configured to receive information from a user through the GUI for assigning one or more of the identified inputs of the app to at least one of the dedicated input control devices.

In some embodiments, a magnetic surface is located between each pair of corner conductors.

In some embodiments, a magnetic surface is located on an inner surface of the at least one snap-in receptacle.

In some embodiments, at least one long side of the case side wall is configured to be flexed so as to allow insertion of a smartphone into the case.

In some embodiments, the case back includes at least one recess for storing a swappable control module while not in use.

In some embodiments, the dedicated input control devices are accessible to a user at an outward facing surface of the case.

In some embodiments, the application program is configured to receive input control information from the at least one of the swappable input control modules and pass it to the one or more assigned inputs of the app.

In some embodiments, the application program is configured to receive input control information from the at least one of the dedicated input control devices and pass it to the one or more assigned inputs of the app.

In some embodiments, the case back includes a wireless transceiver for transmitting the input control information generated by the at least one swappable control module and the at least one dedicated input control device to the application program.

In some embodiments, the smartphone case further includes: a CPU for receiving the control information from the at least one swappable input control module and the at least one dedicated control device and preparing the received control information for transmission by the Bluetooth transceiver.

In some embodiments, a short side of the case sidewall includes an audio jack.

In some embodiments, the pair of swappable control modules is selected from: a Joystick; a D-Pad; a 2-Button; and a Single Button.

In some embodiments, each swappable control module includes: a plurality of snap-in tabs, each snap-in tap being configured to engage with a snap-in receptacle; a plurality of module conductors, each module conductor being configured to engage with a corner conductor; and a plurality of magnetic surfaces, each magnetic surface being configured to engage with a corresponding magnetic surface of a corner connector.

Another general aspect of the invention is a smartphone case for holding and protecting a smartphone, the smartphone case also having features for controlling a video game. This smartphone case includes: a case body, the case body having: a case back; and a case side wall that extends circumferentially around the case back so as to form two long sides, two short sides, and four corners, the case side wall also configured to extend above and below a smartphone when the smartphone is held by the case, thereby forming a front rim that extends above the smartphone and circumferentially around the case, and forming a back rim that extends below the smartphone and circumferentially around the case back, and a pair of corner connectors, a first corner connector included at a first corner at a first end of a long side of the front rim, and a second corner connector included at a second corner at a second end of the long side of the front rim, each corner connector configured to connect with a swappable control module, each corner connector including at least one snap-in receptacle, a plurality of corner conductors, and at least one magnetic surface.

In some embodiments, the smartphone case further includes a plurality of swappable control modules, each swappable control module including: a plurality of snap-in tabs, each snap-in tap being configured to engage with a snap-in receptacle; a plurality of module conductors, each module conductor being configured to engage with a corner conductor; and a plurality of magnetic surfaces, each magnetic surface being configured to engage with a corresponding magnetic surface of a corner connector.

In some embodiments, the case back includes at least one recess for storing a swappable control module while not in use.

In some embodiments, the case back includes: a D-Pad, an A-button, and a B-button.

BRIEF DESCRIPTION OF THE DRAWINGS

Many additional features and advantages will become apparent to those skilled in the art upon reading the following description, when considered in conjunction with the accompanying drawings, wherein.

DETAILED DESCRIPTION

Figure 1:
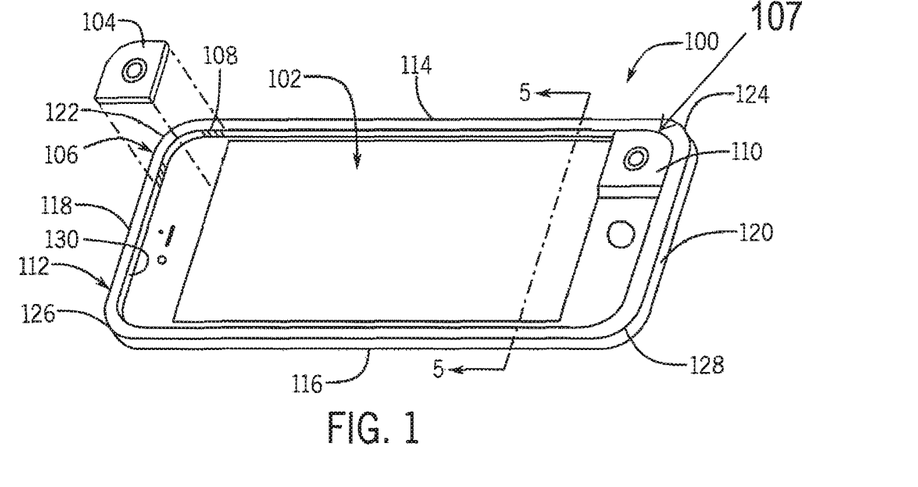
FIG. 1 is an isometric front view of an embodiment of the smartphone case having features for controlling a video game or other app, showing the case with a smartphone inserted therein, also showing two swappable control modules.

With reference to FIG. 1, an isometric front view of an embodiment of the smartphone case 100 is shown. The smartphone case 100 has a smartphone 102 inserted therein. A first swappable control module 104 (a first joystick) is shown above the left corner connector 106, also showing the corner conductors 108 of the corner connector 106. A second swappable control module 110 (a second joystick) is shown inserted in the right corner. When a swappable control module, such as the swappable control module 104, is inserted into a corner connector, such as the corner connector 106, the corner conductors 108 become electrically connected to the module conductors (see FIG. 6A) of the swappable control module 104.

The case 100 has a case side wall 112 that extends circumferentially around the case back 200 (see FIG. 2) so as to form two long sides 114, 116, two short sides 118, 120, and four corners 122, 124, 126, 128.

The case side wall 112 also extends above and below the smartphone 102 when the smartphone 102 is held by the case 100, thereby forming a front rim 130 that extends above the smartphone and circumferentially around the case 100, and which further forms a back rim 214 that extends below the case back 200 and circumferentially around the case back 200. The front rim 130 ensures that when the case 100 with a phone 102 inserted therein rests on a surface on the front rim 130 of the case 100, the screen of the smartphone 102 is supportably elevated from the surface and is thereby protected. Also, the back rim 214 ensures that when the case 100 rests on a surface on the back rim 214 of the case 100, the buttons 202, 204, and the D-Pad 205 (see FIG. 2) are elevated away from contact with the surface, and thereby protected.

Figure 2:
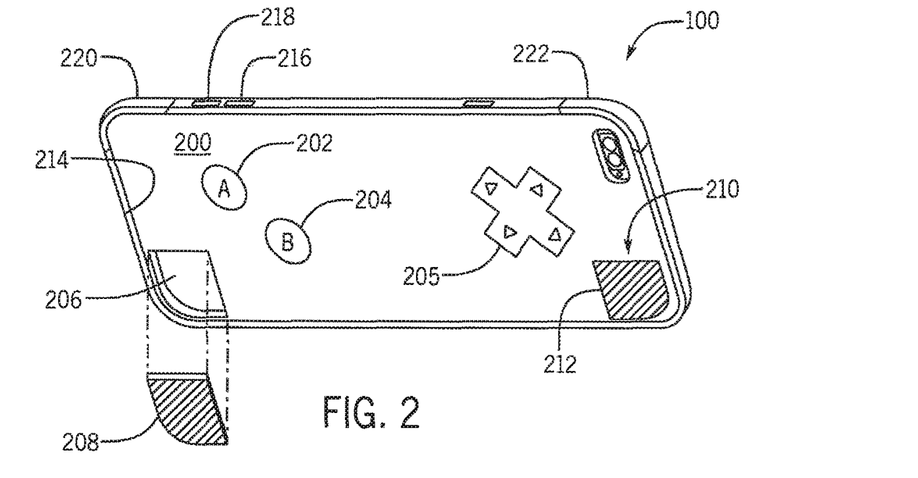
FIG. 2 is an isometric rear view of the smartphone case of FIG. 1, showing an A-button, a B-button, a D-Pad, a recess storing a swappable control module while not in use, and a recess with one swappable control module about to be inserted.

With reference to FIG. 2, an isometric rear view is shown of the smartphone case 100, having a case back 200 with an A-button 202, a B-button 204, and a D-Pad 205 (directional pad). The A-button 202, B-button 204, and D-Pad 205 are fixed on the back of the case 100 to allow for more input control options in addition to the swappable control modules 104, 110.

Also shown is a first compartment 210 for storing a swappable control module 212 while not in use, and a second compartment 206 with a second swappable control module 208 about to be inserted. The swappable control modules 104, 110 can be stored in the back of the case 100 by placing them face down into the compartments 206, 210. The backside of each of the swappable control modules 208, 212 features a stippled surface that helps to keep it in place when it is plugged in.

Also shown is a recessed sync button 214 for connecting the case to the smartphone 102 via Bluetooth, and an on/off button 218. Once the smartphone 102 and the case 100 have been paired, they will remember each other even after a disconnection.

Also included are a left bumper/trigger button 220 and a right bumper/trigger button 222 on the upper left and upper right corners 122, 124, respectively. The purpose and function of the bumper/trigger buttons 220, 222 is the same as traditional left and right trigger buttons that are found on a standard game controller.

Figure 3:
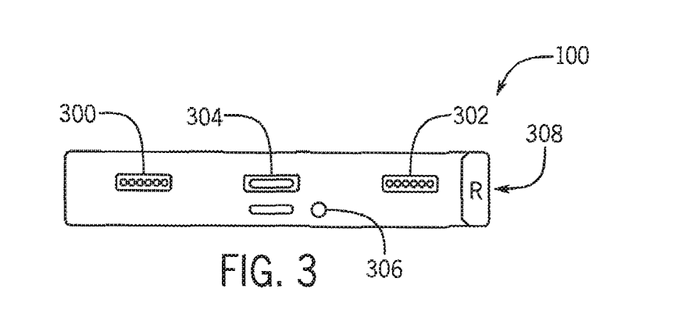
FIG. 3 is a right side view of the smartphone case of FIG. 1, showing two openings for two speakers of the smartphone, a charging port, an audio jack, and a right bumper.

With reference to FIG. 3, a right side view is shown of the smartphone case 100, having two openings 300, 302 for two speakers of the smartphone 102, a charging port 304, an audio jack 306, and a right bumper 308. The audio jack 306 is included only if the smartphone 102 doesn't have an audio jack.

Figure 4:
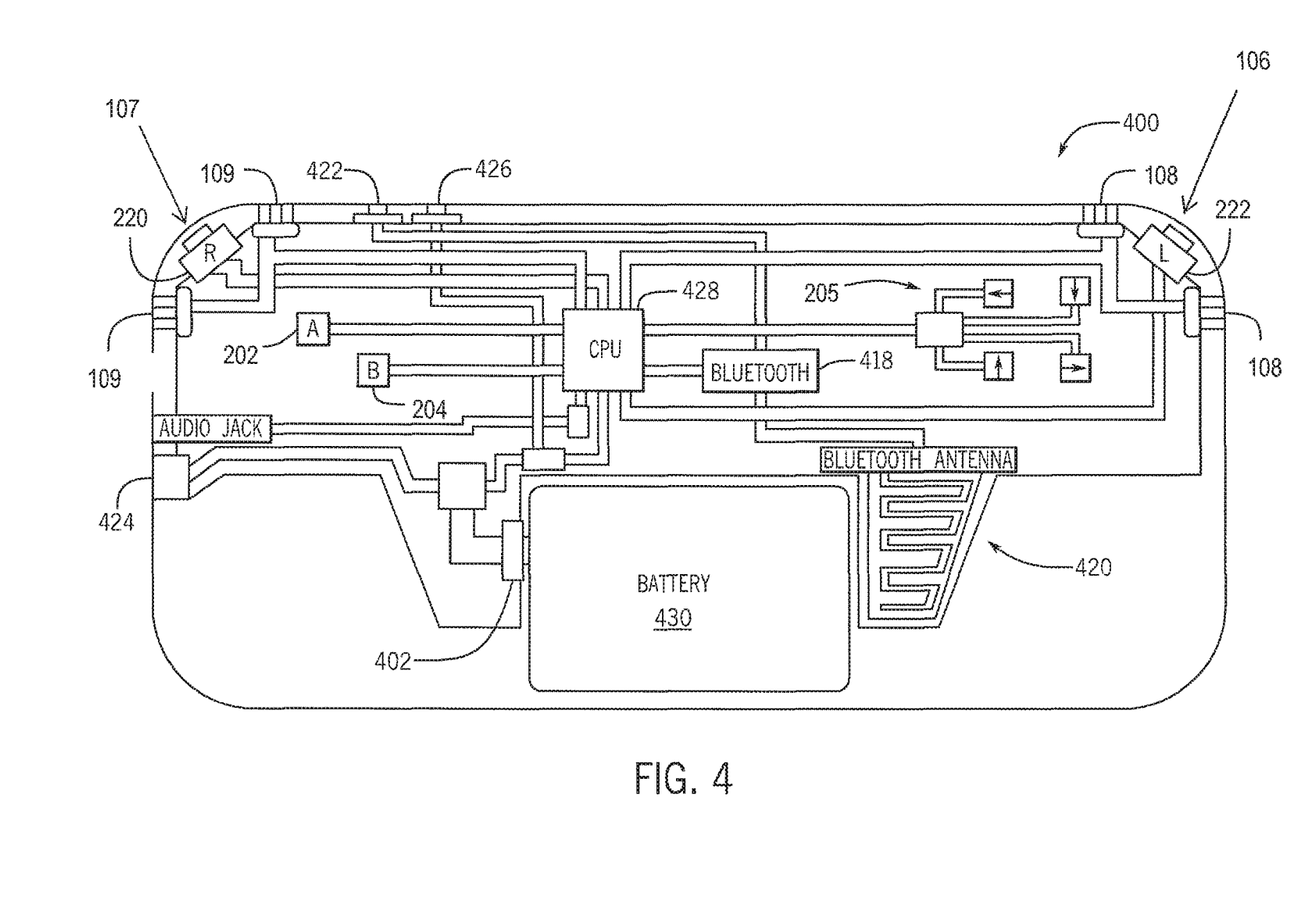
FIG. 4 is a rear view of a printed circuit board for electrically interconnecting a battery connector; two corner connectors; an A-button; a B-button; a D-Pad; Right and Left bumpers, a Bluetooth transmitter/receiver; a Bluetooth antenna; a Bluetooth sync button; a charging port; an on/off switch; a CPU; and a battery.

With reference to FIG. 4, a rear view is shown of a printed circuit board 400 located within the back of the smartphone case 100. The printed circuit board 400 is for electrically interconnecting a battery connector 402; two corner connectors 404, 406; an A-button 408; a B-button 410; a D-Pad 412; right and left bumpers 414, 416; a Bluetooth transmitter/receiver 418; a Bluetooth antenna 420; a Bluetooth sync button 422; a charging port 424; an on/off switch 426; a CPU 428; and a battery 430. The CPU 428 coordinates providing the game control signals generated by operation of the swappable control modules 208, 212 to the CPU of the cell phone (not shown) by way of the Bluetooth transmitter/receiver 418.

Figure 5:
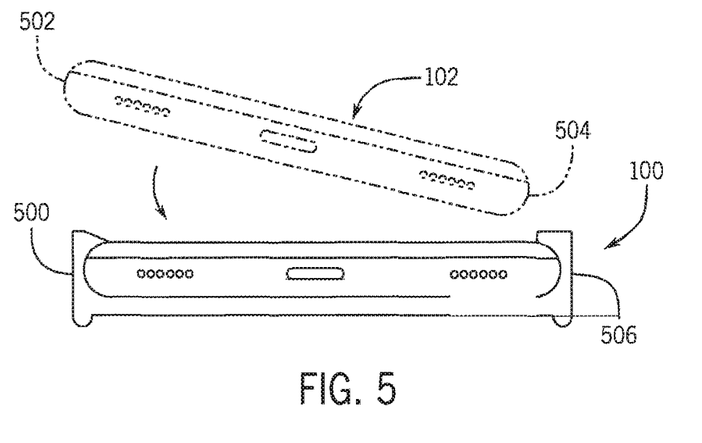
FIG. 5 is a right side cross-section view of the smartphone case of FIG. 1, showing how a smartphone is inserted into the smartphone case.

With reference to FIG. 5, a right side cross-section view is shown of the smartphone case 100, showing how the smartphone 102 is inserted into the smartphone case 100. The case 100 has a slightly flexible left side 500 that can be pulled outward so as to permit the left side 502 of the smartphone 102 to snap into place after the right side 504 of the phone is inserted into the right side 506 of the case 100. The right side 506 of the case 100 is more rigid and less flexible than the left side 500 of the case 100.

Figure 6A:
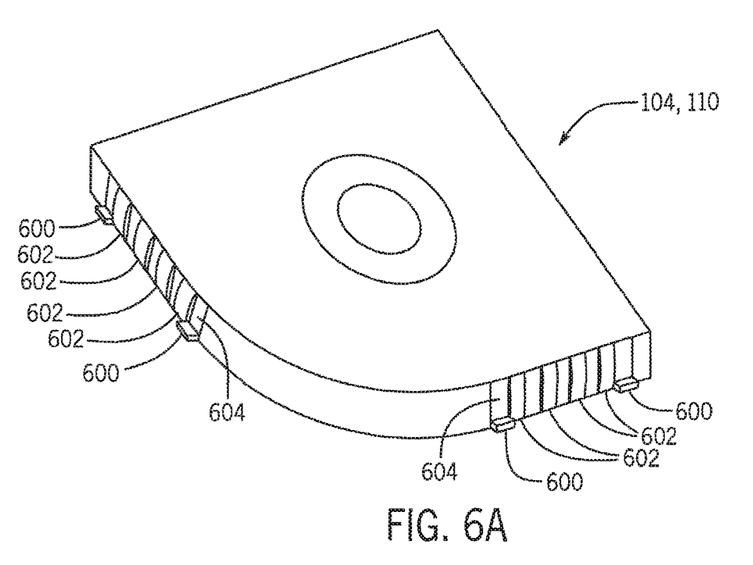
FIG. 6A is an isometric top rear view of a swappable control module, showing four snap-in tabs, a plurality of module conductors, and at least one magnetic surface.

With reference to FIG. 6A, an isometric top rear view is shown of a swappable control module 104, 110, showing four snap-in tabs 600, a plurality of corner conductors 602, and at least one magnetic surface 604. Each module conductor 602 is pressed into electrical connection with a corresponding corner conductor (see FIGS. 1A and 1B) when one or more snap-in tabs 600 engage with one or more respective snap-in receptacles 608 (see FIG. 6B). The snap-in tabs 600 help provide extra support so that the swappable control modules 104, 110 do not disconnect during use.

The at least one magnetic surface 604 helps to hold the swappable control module in place, even when the user applies pressure. In some embodiments, there is more than one magnetic surface 604, such as around each module conductor 602, and on each of the snap-in tabs 600. The module conductors 602 are convex, which fit with the corner conductors 108, which are concave, so as to enhance connection and thereby facilitate data transfer.

Figure 6B:
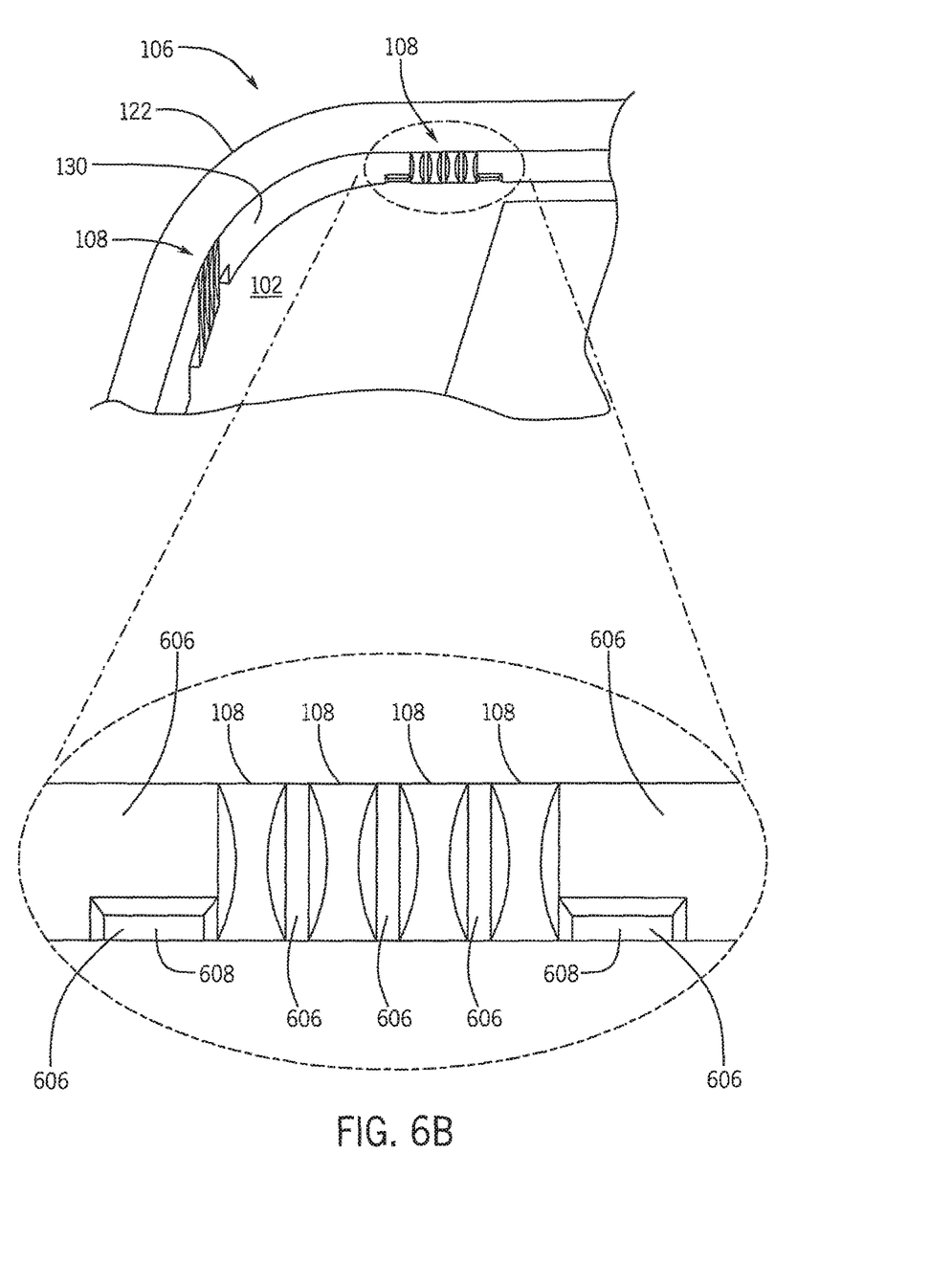
FIG. 6B is a closeup view of the left corner connector of the smartphone case of FIG. 1, also showing a further closeup view of some of the conductors, magnetic surfaces, and snap-in receptacles of the left corner connector.

With reference to FIG. 6B, a closeup view is shown of the left corner connector 106 of the front side of the smartphone case 100, also showing a further closeup view of some of the conductors 108, magnetic surfaces 606, and snap-in receptacles 608 of the left corner connector 106. The upper right and upper left corners 122 and 124 are located in the stiffer side 506 (see FIG. 5) of the rim 112. The upper right and upper left corners 122 and 124 are also made of the stiffer more rigid material. The top surface of the corners 122 and 124 are flat, and the inside surface of the front rim 130 comes down at a 90 degree angle until it touches the top surface of the smartphone 102. The front rim 130 rises above the top surface of the smartphone 102 enough to accommodate the thickness of the swappable control module 104 when it is inserted into the corner connector 106.

The magnetic surfaces 606 of the corner connector 106 are located on each side of each conductor 108, and on the inside of each snap-in receptacle 608. The magnetic surfaces 606 are magnetically attracted to the magnetic surfaces 604 of the swappable control module 104 to help hold each swappable control module 104, 110 in place. The snap-in receptacles 608 of the left corner connector 106 receive the snap-in tabs 600 of the swappable control module 104 to help hold the swappable control module 104 in place.

Figure 7A:
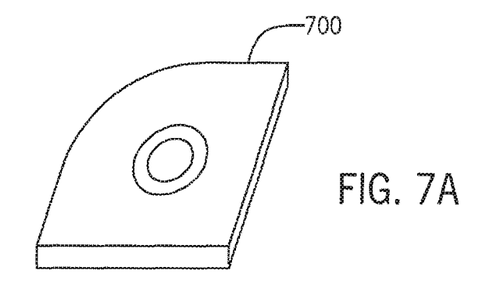
FIG. 7A is an isometric top front view of a Joystick swappable control module.
Figure 7B:
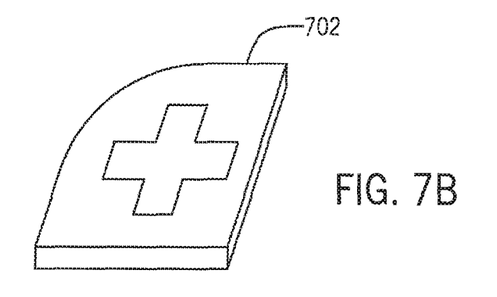
FIG. 7B is an isometric top front view of a D-Pad swappable control module.
Figure 7C:
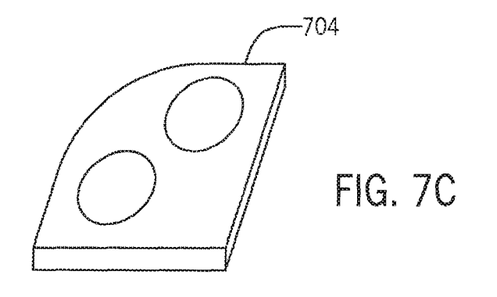
FIG. 7C is an isometric top front view of a 2-Button swappable control module.
Figure 7D:
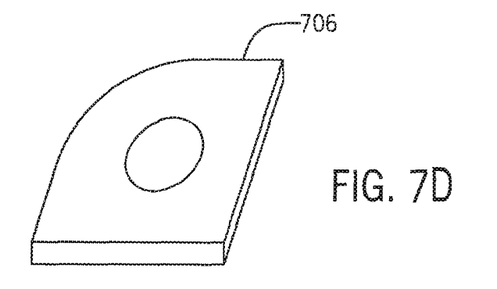
FIG. 7D is an isometric top front view of a Single Button swappable control module.

FIGS. 7A-7D show four embodiments of swappable control modules. Other embodiments of swappable control modules are possible, each different swappable control module providing a particular type of control to the user. With reference to FIG. 7A, an isometric top front view is shown of a Joystick swappable control module 700. With reference to FIG. 7B, an isometric top front view is shown of a D-Pad swappable control module 702. With reference to FIG. 7C, an isometric top front view is shown of a 2-Button swappable control module 704. With reference to FIG. 7D, an isometric top front view is shown of a Single Button swappable control module 706.

Those of skill will appreciate that the smartphone 102 is depicted as an Apple iPhone 6/7 plus, but that the smartphone case 100 of the invention as disclosed herein can be adapted to any smartphone that has the requisite processing capability to run gaming apps and the ability to communicate via a wired or non-wired communications interface with the CPU 428 of smartphone case 100. While the dimensions of the screen may change between different types of phones, those of skill in the art will appreciate that the apps themselves can be written to produce a graphic output that is compatible with the screen size of the phone so that the swappables do not overlap the graphics displayed by the smartphone.

Those of skill in the art will appreciate that cell phones that are classified as being smartphones have a processor and non-volatile memory that can be used to execute apps (application programs) of many kinds. These can include gaming apps, word processing apps, music recording apps and the like that require interactive control inputs from a user. These apps can be pre-loaded (i.e. stored in the non-volatile memory of the smartphone), or they can be downloaded from a website such as the Apple App Store (providing apps running on the iOS operating system) or the Google Play Store (providing apps running on the Android operating system).

To facilitate the reconfigurability of the swappables and their assignment to input functions required by the apps which they will control, an app 800 of the invention is provided that produces a graphical user interface (GUI) that guides a user through the process of establishing functional configurations of the input control functions through assignments of those controls to the inputs of the app. Those of skill in the art will recognize that app 800 can be written in accordance with the software schematic of FIGS. 8A-8D for any mobile operating system (OS) installed on the smartphone 102 (e.g. iOS or Android). Those of skill in the art will appreciate that coding the app 800 of the invention as described by the software schematic of the invention (FIGS. 8A-8D) for a given OS is well within the grasp of one of ordinary skill in the art.

Figure 8A:
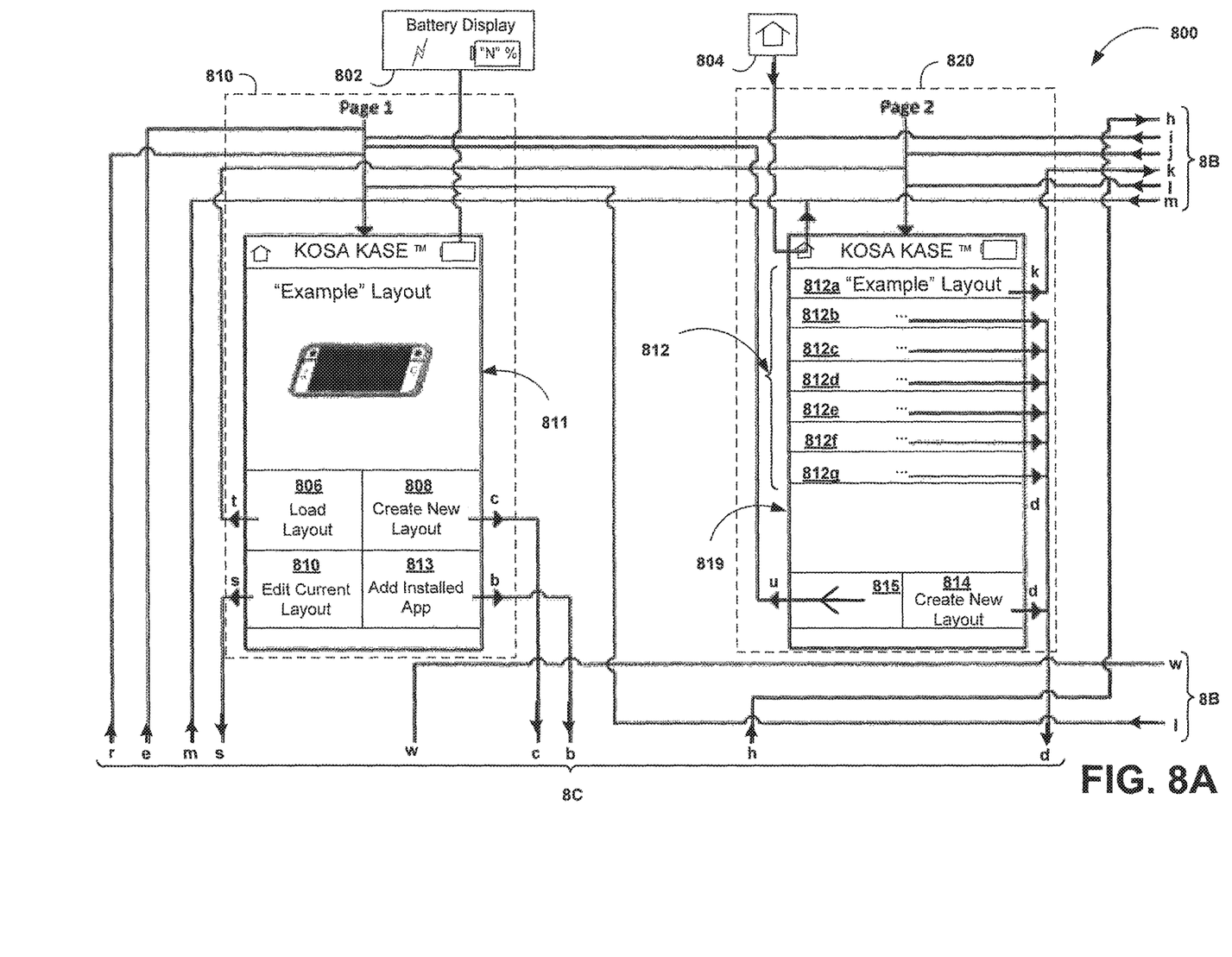
FIGS. 8A-8D are software schematics that describe an embodiment of the functional flow of an application program of the invention for configuring the smartphone case to provide gaming interface controls.
Figure 8B:
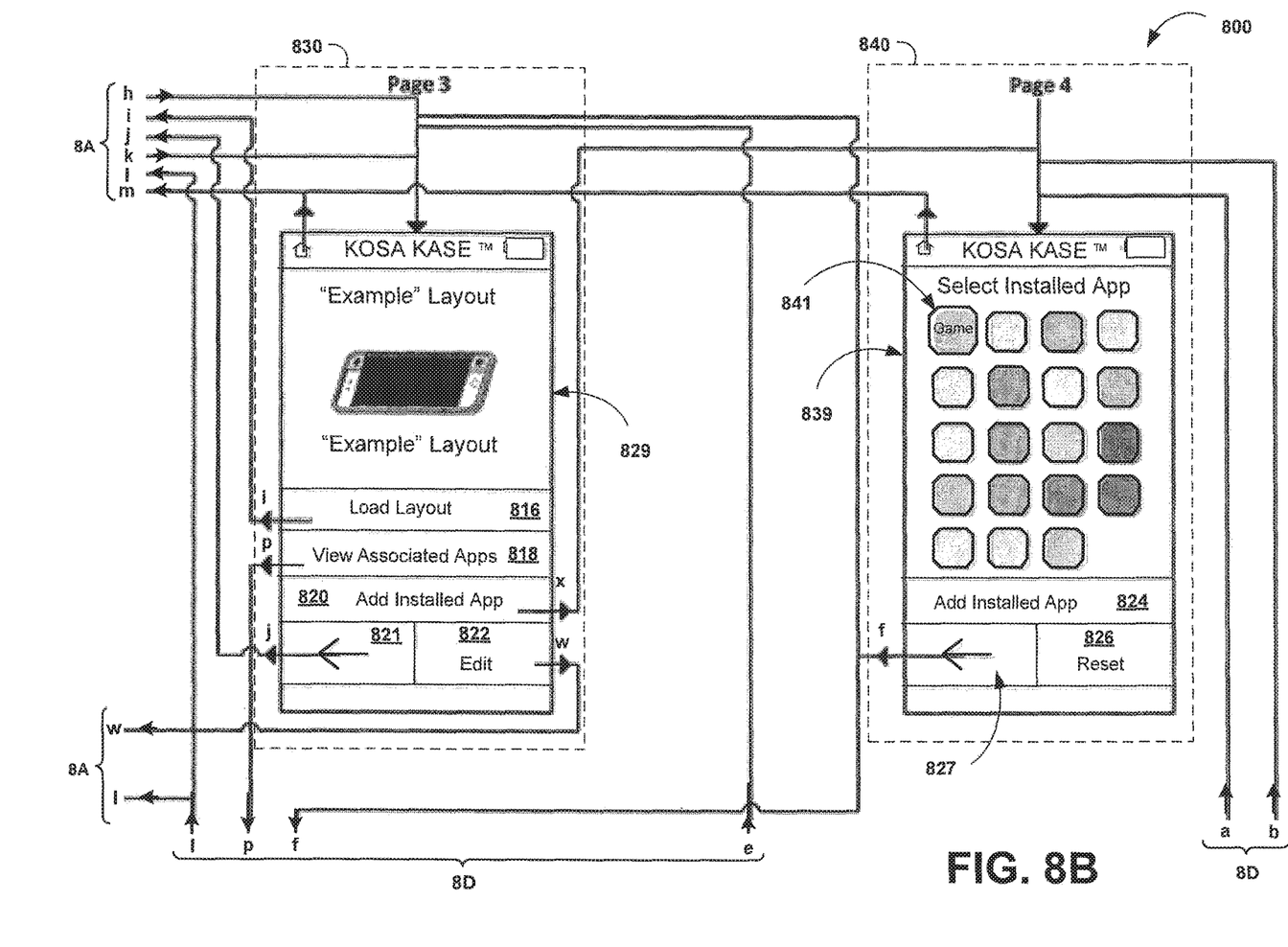
Figure 8C:
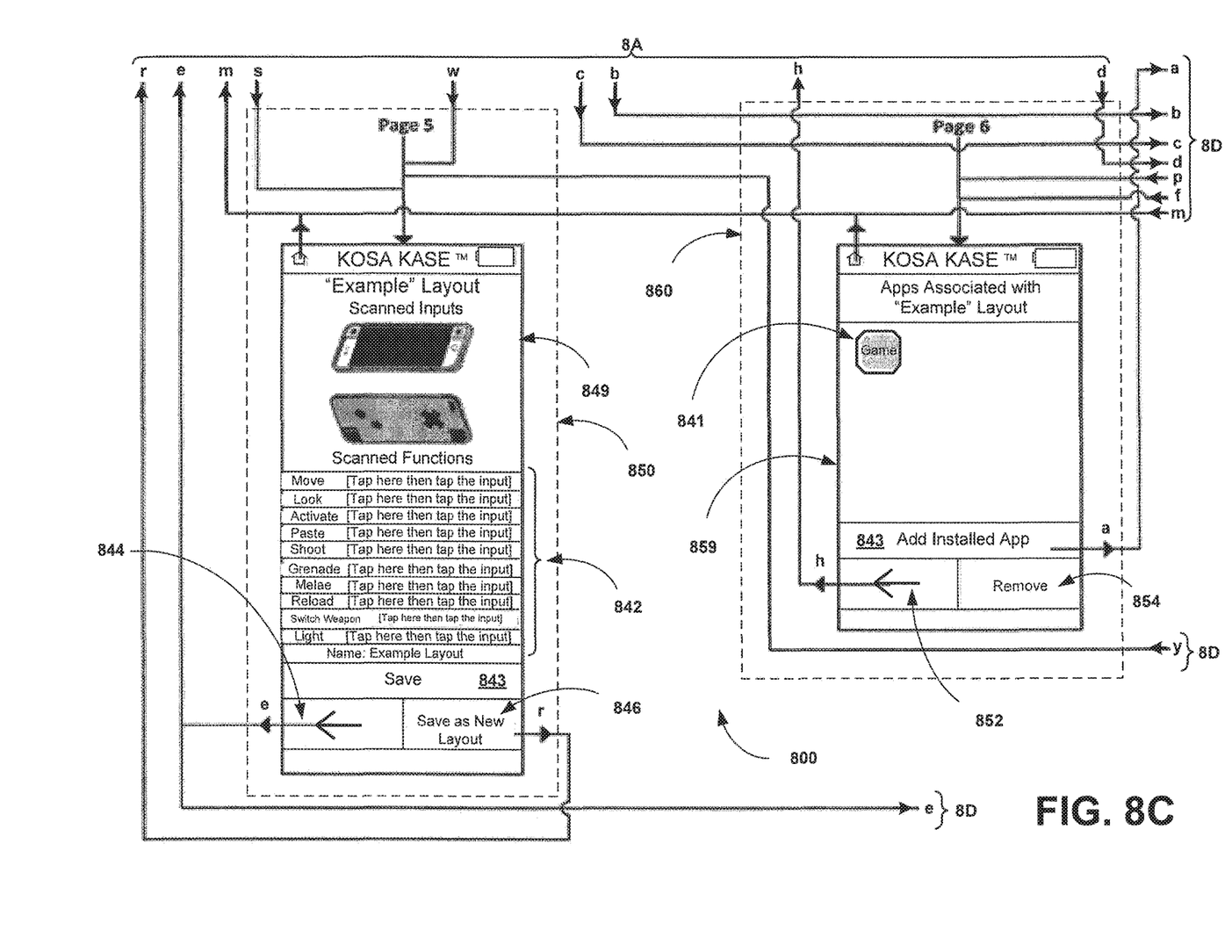
Figure 8D:
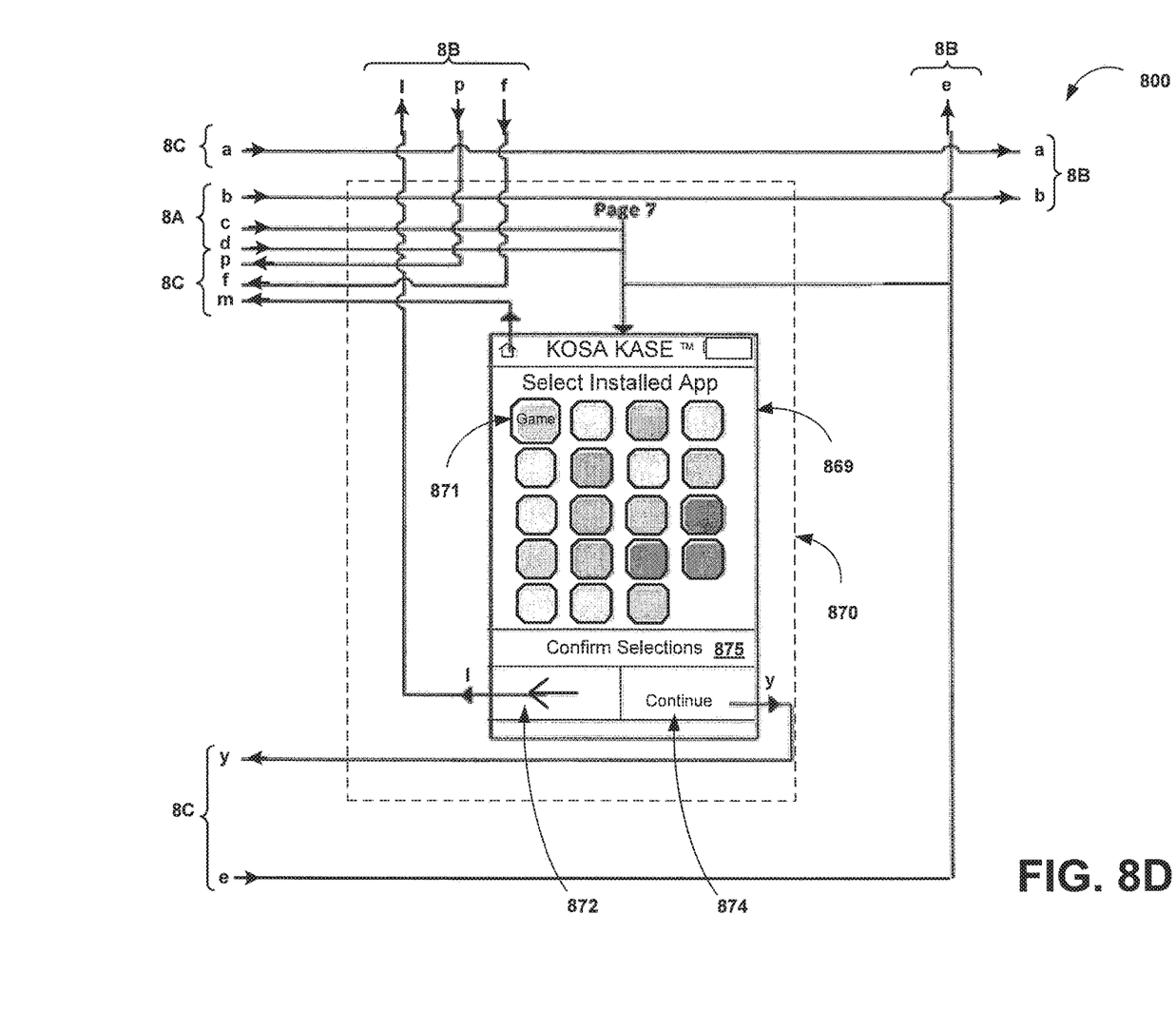

FIGS. 8A-8D together illustrate a software schematic for an app of the invention 800 that is stored in the non-volatile memory, and executed by the processor of, the smartphone 102 in conjunction with the smartphone case 100. The software schematic illustrates the seven views or pages of a graphical user interface (GUI) that will be displayed on the screen of the smartphone 102 as the user navigates through the app of the invention 800. The logical flow lines between the pages are labeled by letters and arrows to indicate navigational direction to make them easier to follow as they span the FIGS. 8A-8D. FIG. 8A illustrates pages 1 (810) and 2 (820) of the app of the invention 800. FIG. 8B illustrates pages 3 (830) and 4 (840) of the app of the invention 800. FIG. 8C illustrates the pages 5 (850) and 6 (860) of the app of the invention 800. FIG. 8D illustrates page 7 (870) of the app of the invention 800. Each page includes a graphical display 811, 819, 829, 839, 849, 859, and 869 and a unique array of displayed buttons that can be actuated by a user through the touch sensitive screen of smartphone 102 to navigate through the app, and through which to provide configuration information that enables the game controller buttons smartphone case 100 to interact with gaming apps loaded and running on the smartphone 102.

The graphical display for each page shows a battery life monitor 802 for the smartphone case battery 430, FIG. 2. The monitor constantly displays the current battery life expectancy in the form of a percentage. It will also display whether or not the case is plugged in by way of the lightning bolt icon that tells the user that the charger is plugged in.

The graphical display for each page further includes a home button 804 at the top left corner of the page currently displayed. No matter which page is currently displayed, touching the home key will always send the app of the invention 800 back to page 1 (810). As an example of how to read the logical flow lines, note that for FIG. 8D, the HOME button for page 7 (870) is coupled to flow line m. The flow line flows from FIG. 8D to FIG. 8C as indicated by the arrow of the flow line and the bracket labeled 8C. If one then proceeds to FIG. 8C, it can be seen that logical flow line m flows into FIG. 8D as indicated by the arrow and the bracket labeled 8D on FIG. 8C. Flow line m is then coupled to the HOME buttons of both Pages 5 (850) and 6 (860) respectively. Flow line m then flows from FIG. 8C to FIG. 8A as indicated by the bracket labeled 8A and the arrow. The flow line flows in from 8C and is coupled to the HOME button for page 2 (820). Flow line m then ends at page 1 (810). It should also be noted that logical flow line m also flows in from FIG. 8B because the Home buttons for pages 3 (830) and 4 (840) are coupled together and flow into FIG. 8A and flow back into page 1 (810) from there as well. Thus, depressing the Home button for any of pages 2-7 sends processing of the app program of the invention back to page 1. Those of skill in the art will appreciate that the HOME button on page 1 (810) is not coupled to logic flow line m because the app is already at page 1.

Page 1 (810), which is also the home page as discussed above, is shown in FIG. 8A. The current control layout is displayed in for example, the upper half of the app display 811 for Page 1. This displayed configuration includes the dedicated control buttons in the back surface of the smartphone case 102 (i.e. A and B buttons 202, 204, right 220 and left 222 bumper buttons, and the D-Pad 205 of FIG. 2) as well as the swappable modules 104, 110 currently installed and coupled to the right 107 and left 106 corner connectors. The display also shows the title of the current layout, e.g. "Example Layout," as shown in FIG. 8A.

Four touch sensitive buttons are also displayed for Page 1. Load Layout button 806 of Page 1, when tapped by a user, causes processing to advance to display Page 2 (as indicated by logical flow line t), from which the user can select a saved layout to load. The Create New Layout button 808 of Page 1, when tapped by a user, advances the app to display Page 7 (as indicated by following logical flow line c), from which to choose which app/apps stored on the smartphone 102 will be associated with the newly created layout. The Edit Current Layout button 810 of Page 1 (when actuated by the user), takes the user to Page 5 (as indicated by following logical flow line s), from which to edit the configuration of the current layout. The Add Installed App button when tapped takes the user to Page 4, from which the user can choose which additional app/apps stored on the smartphone 102 the user would like to add to (i.e. associate with) the current layout.

Page 2 (820) of the app of the invention 800 is also shown in FIG. 8A. Page 2 displays all of the user's saved layouts. It also lets the user choose to switch the current layout to a different layout. Page 2 presents a display 519 to the user that includes a list of saved layouts (i.e. "Example Layout"). The user can tap on the saved layout labeled "Example Layout" 812a, which causes the app to advance the user's smartphone display to Page 3 (820) of FIG. 8B to view the details of the selected existing layout (as is indicated by following logical flow line k to FIG. 8B). In the diagram of Page 2, the user will see that there are selectable areas 812b-812g, each with an elipsis " . . . " in the center. When the user taps on that area of the next empty entry to add a name for a new layout, the app moves to Page 7 of FIG. 8D (as indicated by following logical flow line d) which is the same logical destination of the app when actuating the Create New Layout button 808 from Page 1. If a user eventually uses all of the displayed " . . . " layout entries 812b-812g, a new one will appear at the bottom of the layouts list. Actuating the "back arrow" button 815 returns processing back to Page 1 as can be seen by following logical flow line u.

Page 3 (830) is illustrated in FIG. 8B. Page 3 allows the user to view a selected layout through graphical display 829, and the user can choose to operate on the displayed layout through the actuation of five buttons. The Load Layout button 816 moves processing to Page 1 (as indicated by following logical flow line i) and renders the layout currently displayed 829 on Page 3 as the new "currently loaded" layout. The View Associated Apps button 818 takes processing to Page 6 (FIG. 8C) (as indicated by flow line p) to display the apps stored on the smartphone 102 that are currently associated with the selected and currently displayed layout. The Add Installed App button 820 causes processing to move to Page 4 (840) (as indicated by flow line x) to permit a user to choose which additional app/apps the user would like to add the list of such apps to be associated with the selected (and thereby currently displayed) layout. The Edit button 822 when tapped causes processing to move to Page 5 (850, FIG. 8c) (as indicated by flow line w, to permit the user to edit the configuration parameters of the currently selected and displayed layout. The back arrow button forces processing back to the previous Page 2, as indicated by flow line j.

Page 4 (840) is also illustrated in FIG. 8B. Page 4 provides a graphic display 839 through which the user can add/remove apps that are associated with layouts. When Page 4 is loaded, the app of the invention 800 (i.e. the KOSA KASE™ app) automatically scans the smartphone 102 memory for currently installed apps and displays them as shown in FIG. 8B. The user can tap on the apps to choose which apps the user would like to associate with the selected layout. The Add Installed App button 824 adds any of the displayed apps to the selected layout that the user previously selected by tapping them. The Reset button unselects any selected apps and re-scans the smartphone 102 for installed apps once again. The back arrow button takes the processing back to either Page 3 (FIG. 8B) or Page 6 (860) depending on from which of the two pages was active before moving to Page 4.

Page 5 (850) is illustrated on FIG. 8C. Page 5 provides a graphic display 849 through which the user can assign the Swappables 104, 110 and the dedicated buttons (i.e. A and B buttons 202, 204, the right 220 and left 222 bumper buttons, and the D-Pad 205 of FIG. 2) to the selected app's input functions. When Page 5 loads as a result of the app having navigated to Page 5, it automatically scans the selected app or input functions as displayed in the middle portion of the Page 5 displayed graphical interface 849. In the upper half of the graphic display 849, the Layout that is selected for editing is displayed. The middle portion of the graphic display 849 shows the scanned input functions of the app. In this case, the listed functions suggest that the selected app is a type of shooting game.

The app of the invention 800 displays each function (e.g. "move," "look," activate, etc. in a separate text box 842. When a user taps in a text box 842 where it says "(Tap here then tap the input)," the user can tap directly onto the text inside of the parenthesis. The user can tap on a desired input such as one of the swappables or a permanent or dedicated button to assign the function identified in the text box to the selected physical input. A user can repeat the selection process for all of the listed Scanned Input Functions 842. Below the list of "Scanned Input Functions" 842, another text box is provided for entering a Name for a newly configured layout.

Three buttons are provided at the bottom of the graphical user interface display 849. The Save button 843 saves any changes made to existing layouts without creating a completely new layout. The Save As New Layout button 846 saves any edits made to an already existing layout as a new layout without deleting or changing the original layout. The back arrow button returns processing to the take the user back to either Page 1, 3, or 7 depending on which page the user was previously on before the app navigated to Page 5.

Page 6 (860) is also illustrated on FIG. 8C. Page 6 presents a graphical representation 859 of the apps that are already associated with a selected layout. One or more of the installed apps associated with the selected layout can be selected by tapping them to select the app (e.g. the "Game" App 841). The selected installed app(s) such as Game app 841 can be disassociated from the currently loaded or selected layout by then actuating the Remove button 854. The Add Installed App button 843 will send processing to Page 4 (as indicated by logical flow line a), where all of the app/apps loaded on the smartphone 102 are displayed, thereby permitting a user to select which of app(s) to add to the selected layout as previously discussed with reference to Page 6 above. The back arrow button 852 will take the app of the invention 800 back to Page 3 as indicated by the flow line h.

Page 7 (870) is illustrated by FIG. 8D. When processing of the app of the invention 800 moves to Page 7 (870) and it loads, the app automatically scans for all installed apps and presents them to the user via the graphical interface 869 as illustrated in FIG. 8D. By tapping the displayed icons representing the installed apps found by the scan, the user can select which installed apps the user would like to associate with the new layout. The selected apps are then associated with the new layout when the Confirm Selections button 875 of the graphical interface 869 is actuated. Activating the Continue button will cause the app to move to Page 5 (as indicated by flow line y) to configure all of the scanned Input Functions found for the new layout. The return back arrow button 872 causes the KOSA KASE app of the invention 800 to return to either Page 1 or Page 2 (as indicated by logical flow line l), depending upon from which page the app entered Page 7.

Those of skill in the art will appreciate that the app of the invention 800 allows a user to establish virtually any number of layouts by which to assign the swappable modules 104, 110 and the dedicated control buttons 202, 204, 205 controls of the smartphone case 100 to provide the requisite inputs for apps installed on the smartphone such as a gaming apps, and to associate those layouts with any of those loaded apps.

Those of skill in the art will further appreciate that the scanning functions performed by the app of the invention 800 are conducted by application program interfaces (APIs), the coding for which are well within the ability of those of ordinary skill in the art. Those of skill in the art will further appreciate that the signals generated by the swappable 104, 110 and dedicated control functions 202, 204, 205 of the smartphone case 100 can be processed and delivered to the app of the invention 800 by the CPU 428 through the Bluetooth module and antenna 418 and 420, and which are then provided through an API in accordance with the currently loaded layout, to any of the loaded apps currently associated with the currently loaded layout.

Those of skill in the art will recognize that the case 100 of the invention can be used to control the inputs for more than just game apps. The app 800 of the invention can scan any app installed on the smartphone 102 and identify a standard set of input functions 842 with which the app 800 is to provide input derived from the buttons and swappables. These functions would be listed in the graphic display of Page 5 of the app as discussed above and illustrated in FIG. 8C after selecting the app on Page 7 of FIG. 8D. For example, most apps (e.g. word processing and document apps) have a Delete function, Copy function, Paste Function, etc. The app 800 of the invention makes all of these functions (which are normally buried in a menu) readily accessible and instantaneous controlled. As an example, to delete a MIDI note in a music processing app, a user would have to touch and hold or double tap the smartphone touch screen to first display a menu that provides a choice of functions that allows one to delete or edit the note.

Using the app of the invention 800, one can just assign the delete function to any of the buttons on the phone case 100 of the invention, whether permanent or one of the swappables 104, 110. This provides a delete button by which to delete items such as notes instantly by actuating the assigned button. One could also assign a drag or extend function to a button or joystick by which to drag or extend or otherwise precisely manipulate selected MIDI notes on the screen without having one's finger in the way of one's vision.

I another example, using a word processing app on a phone can be frustrating when trying to move a cursor with a finger. A finger can cover the very items displayed on the screen that one wishes to manipulate. While many phones are able display what is under your finger with a magnifying glass style graphic, simply rolling the finger the wrong way when removing it after placement can relocate it from the desired location. Those frustrations can be alleviated by assigning the cursor movement function to, for example, the D-Pad 205 on the back of the case 100 of the invention or to an installed D-Pad swappable 205.

Other modifications and implementations will occur to those skilled in the art without departing from the spirit and the scope of the invention as claimed. Accordingly, the above description is not intended to limit the invention, except as indicated in the following claims.

What is claimed is:

1. A smartphone case for holding and protecting a smartphone, the smartphone case also having features for controlling a video game, the smartphone case comprising:
 a case body, the case body having:
  a case side wall that extends circumferentially around the case to form and four corners; and
  a pair of corner connectors including a first corner connector and a second corner connector, each of said first and second corner connector configured to connect with a swappable control module; and
 a pair of swappable control modules, each swappable control module configured to connect with a corner connector of the pair of corner connectors, the swappable control modules configured to provide input control information to one or more applications running on the smartphone when the smartphone is held by the case;
 wherein at least one of the swappable control modules is assigned to control one or more inputs of an app by an application program running on the smartphone when held by the case, the application program configured to:
 scan the app to identify inputs of the app for assignment and display them using a graphical user interface (GUI), and
 receive information from a user through the GUI for assigning the one or more of the identified inputs of the app to at least one of the swappable control modules.

2. The smartphone case of claim 1, further comprising one or more dedicated input control devices each configured to be assigned by a user through the GUI of the application program, wherein the application is further configured to receive information from a user through the GUI for assigning one or more of the identified inputs of the app to at least one of the dedicated input control devices.

3. The smartphone case of claim 1, wherein at least one long side of the case side wall is configured to be flexed so as to allow insertion of a smartphone into the case.

4. The smartphone case of claim 1, wherein the dedicated input control devices are accessible to a user at an outward facing surface of the case.

5. The smartphone case of claim 1, wherein the application program is configured to receive input control information from the at least one of the swappable input control modules and pass it to the one or more assigned inputs of the app.

6. The smartphone case of claim 5, wherein the application program is configured to receive input control information from the at least one of the dedicated input control devices and pass it to the one or more assigned inputs of the app.

7. The smartphone case of claim 6, wherein the case body includes a wireless transceiver for transmitting the input control information generated by the at least one swappable control module and the at least one dedicated input control device to the application program.

8. The smartphone case of claim 7, further including a CPU for receiving the control information from the at least one swappable input control module and the at least one dedicated control device and preparing the received control information for transmission by a Bluetooth transceiver.

9. The smartphone case of claim 1, wherein a short side of the case sidewall includes an audio jack.

10. The smartphone case of claim 1, wherein the pair of swappable control modules is selected from:
- a Joystick;
- a D-Pad;
- a 2-Button; and
- a Single Button.

11. A smartphone case for holding and protecting a smartphone, the smartphone case also having features for controlling a video game, the smartphone case comprising:
- a case body, the case body having:
  - a case side wall that extends circumferentially around the case to form two long sides, two short sides, and four corners; and
  - a pair of corner connectors including a first corner connector and a second corner connector, each of said first and second corner connector configured to connect with a swappable control module;
  - a pair of swappable control modules, each swappable control module configured to connect with a corner connector of the pair of corner connectors, the swappable control modules configured to provide input control information to one or more applications running on the smartphone when the smartphone is held by the case
- wherein each corner connector includes:
  - at least one snap-in receptacle, a plurality of corner conductors, and at least one magnetic surface; wherein a magnetic surface is located between each pair of corner conductors.

12. The smartphone case of claim 11, wherein a magnetic surface is located on an inner surface of the at least one snap-in receptacle.

13. The smartphone case of claim 11, wherein each swappable control module includes:
- a plurality of snap-in tabs, each snap-in tap being configured to engage with a snap-in receptacle;
- a plurality of module conductors, each module conductor being configured to engage with a corner conductor; and
- a plurality of magnetic surfaces, each magnetic surface being configured to engage with a corresponding magnetic surface of a corner connector.

14. A smartphone case for holding and protecting a smartphone, the smartphone case also having features for controlling a video game, the smartphone case comprising:
- a case body, the case body having:
  - a case side wall that extends circumferentially around the case to form two long sides, two short sides, and four corners; and
  - a pair of corner connectors including a first corner connector and a second corner connector, each of said first and second corner connector configured to connect with a swappable control module; and
  - a pair of swappable control modules, each swappable control module configured to connect with a corner connector of the pair of corner connectors, the swappable control modules configured to provide input control information to one or more applications running on the smartphone when the smartphone is held by the case;
- wherein the case body includes at least one recess for storing a swappable control module while not in use.

15. A smartphone case for holding and protecting a smartphone, the smartphone case also having features for controlling a video game, the smartphone case comprising:
- a case body, the case body having:
  - a case side wall that extends circumferentially around the case to form two long sides, two short sides, and four corners; and
  - a pair of corner connectors including a first corner connector and a second corner connector, each of said first and second corner connector configured to connect with a swappable control module; each corner connector including at least one snap-in receptacle, a plurality of corner conductors, and at least one magnetic surface;
- wherein the case body includes at least one recess for storing a swappable control module while not in use.

16. The smartphone case of claim 15, further including a plurality of swappable control modules, each swappable control module including:
- a plurality of snap-in tabs, each snap-in tap being configured to engage with a snap-in receptacle;
- a plurality of module conductors, each module conductor being configured to engage with a corner conductor; and
- a plurality of magnetic surfaces, each magnetic surface being configured to engage with a corresponding magnetic surface of a corner connector.

17. A smartphone case for holding and protecting a smartphone, the smartphone case also having features for controlling a video game, the smartphone case comprising:
- a case body, the case body having:
  - a case side wall that extends circumferentially around the case to form two long sides, two short sides, and four corners, and
  - a pair of corner connectors including a first corner connector and a second corner connector each of said first and second corner connector configured to connect with a swappable control module; each corner connector including at least one snap-in receptacle, a plurality
- of corner conductors, and at least one magnetic surface;
- wherein the case body includes:
  - a D-Pad;
  - an A-button; and
  - a B-button.

* * * * *